United States Patent
Kim et al.

(10) Patent No.: US 9,306,914 B2
(45) Date of Patent: Apr. 5, 2016

(54) METHOD AND SYSTEM FOR BACKING UP PROFILES OF AUTHENTICATION MODULE

(71) Applicant: KT CORPORATION, Seongnam-si, Gyeonggi-do (KR)

(72) Inventors: Kwanlae Kim, Suwon-si (KR); Chul-Hyun Park, Yongin-si (KR); Jin-Hyoung Lee, Seongnam-si (KR); Hyung-Jin Lee, Seoul (KR)

(73) Assignee: KT Corporation, Seongnam (KR)

( * ) Notice: Subject to any disclaimer, the term of this patent is extended or adjusted under 35 U.S.C. 154(b) by 97 days.

(21) Appl. No.: 13/918,247

(22) Filed: Jun. 14, 2013

(65) Prior Publication Data

US 2014/0006779 A1 Jan. 2, 2014

(30) Foreign Application Priority Data

| Jun. 15, 2012 | (KR) | 10-2012-0064520 |
| Sep. 7, 2012 | (KR) | 10-2012-0099088 |
| Jun. 10, 2013 | (KR) | 10-2013-0065998 |

(51) Int. Cl.
*H04L 29/06* (2006.01)
*H04W 12/06* (2009.01)

(52) U.S. Cl.
CPC ........ *H04L 63/0428* (2013.01); *H04L 63/0853* (2013.01); *H04W 12/06* (2013.01)

(58) Field of Classification Search
CPC ....... G06F 21/70; G06F 21/606; G06F 21/78; G06F 11/1402; H04L 63/0428
See application file for complete search history.

(56) References Cited

U.S. PATENT DOCUMENTS

2012/0190354 A1* 7/2012 Merrien et al. ............ 455/422.1
2013/0275695 A1* 10/2013 Ponsford et al. .............. 711/162

FOREIGN PATENT DOCUMENTS

| KR | 10-0474290 B1 | 2/2005 |
| KR | 1020080066790 A | 7/2008 |

* cited by examiner

*Primary Examiner* — Izunna Okeke
(74) *Attorney, Agent, or Firm* — Sughrue Mion, PLLC

(57) ABSTRACT

A system for backing up a profile includes: a management server that stores and manages received information and a terminal that generates a plurality of division profiles by dividing a profile that is stored at an embedded authentication module and that transmits backup request information including the plurality of division profiles to the management server, wherein the management server stores the plurality of division profiles based on the backup request information.

18 Claims, 9 Drawing Sheets

METHOD AND SYSTEM FOR BACKING UP PROFILES OF AUTHENTICATION MODULE

CROSS-REFERENCE TO RELATED APPLICATION

This application claims priority to and the benefit of Korean Patent Application No. 10-2012-0064520, 10-2012-0099088, 10-2013-0065998 filed in the Korean Intellectual Property Office on Jun. 15, 2012, Sep. 7, 2012, and Jun. 10, 2013, the entire contents of which are incorporated herein by reference.

BACKGROUND (a) Field of the Invention

The present invention relates to a method and system for backing up a profile of an authentication module.

(b) Description of the Related Art

A universal integrated circuit card (UICC) is a smart card that is inserted into a terminal and is a module for user authentication. The UICC can store a profile including a user's personal information and provider information of a mobile communication provider in which a user subscribes. For example, the UICC may include international mobile subscriber identity (IMSI) for identifying a user. The UICC is called a subscriber identity module (SIM) card in a global system for mobile (GSM) method and a universal subscriber identity module (USIM) card in a wideband code division multiple access (WCDMA) method.

A terminal performs user authentication using information that is stored at the UICC. Therefore, the user can conveniently communicate, authenticate, and pay using the UICC. Further, when the user replaces a terminal, the user inserts an UICC of an existing terminal into a new terminal. Therefore, by replacing a detachable UICC, the user can transfer the user's personal information and mobile communication provider information to a new apparatus.

Nowadays, a communication terminal such as machine to machine (M2M) is produced in a small size. At such a terminal, instead of a detachable UICC, an embedded UICC (eUICC) is mounted. The eUICC cannot be physically removed from a terminal or inserted into a terminal, unlike the detachable UICC. Therefore, it is difficult to transfer a profile that is stored at the UICC to another embedded UICC or another repository.

SUMMARY

The present invention has been made in an effort to provide a method and system for backing up a profile.

An exemplary embodiment of the present invention provides a system for backing up a profile that is stored at an authentication module, the system including: a terminal that generates a plurality of division profiles by dividing a profile that is stored at the authentication module and that transmits backup request information including the plurality of division profiles; and a management server that receives the backup request information and that stores the plurality of division profiles based on the backup request information.

The terminal may encrypt each of the plurality of division profiles and transmit the plurality of encrypted division profiles to the management server.

The terminal may receive an input of information of at least one repository that stores the plurality of division profiles.

The backup request information may further include the repository information.

The management server may store each of the plurality of division profiles at a designated repository.

The backup request information may further include user identification information.

The terminal may generate a first division profile including communication provider information and a second division profile including information other than the communication provider information.

The terminal may generate a first division profile including communication provider information, a second division profile including a user's personal information, and a third division profile including other information, and the other information may be information other than the communication provider information and the personal information in the profile.

The management server may store a division profile including communication provider information at a repository that is designated by the communication provider.

The authentication module may be an embedded authentication module that is embedded at the terminal.

Another embodiment of the present invention provides a method in which a terminal backs up a profile that is stored at an authentication module to a management server, the method including: generating a plurality of division profiles by dividing a profile that is stored at the authentication module; and transmitting backup request information including the plurality of division profiles to the management server.

The method may further include encrypting each of the plurality of division profiles, wherein the backup request information may include the plurality of encrypted division profiles.

The method may further include receiving an input of information of at least one repository that stores the plurality of division profiles, wherein the backup request information may further include the repository information.

The backup request information may further include user identification information.

The generating of a plurality of division profiles may include generating a first division profile including communication provider information and a second division profile including information other than the communication provider information.

The generating of a plurality of division profiles may include generating a first division profile including communication provider information, a second division profile including a user's personal information, and a third division profile including other information, and the other information may be information other than the communication provider information and the personal information in the profile.

Yet another embodiment of the present invention provides a method in which a management server backs up a profile of an authentication module, the method including: receiving backup request information including a plurality of division profiles from a terminal; and storing the plurality of division profiles based on the backup request information.

The backup request information may include the encrypted plurality of division profiles.

The backup request information may further include information of at least one repository that stores the plurality of division profiles, and the storing of the plurality of division profiles may include storing each of the plurality of division profiles at a designated repository.

The method may further include mapping and storing user identification information and the repository information, wherein the backup request information may further include the user identification information.

According to an exemplary embodiment of the present invention, a profile can be divided and back up at a plurality of repositories. According to an exemplary embodiment of the present invention, even if an embedded authentication module cannot be physically detached, a profile that is stored at the embedded authentication module can be freely transferred to another repository. Particularly, according to an exemplary embodiment of the present invention, because personal information sensitive to privacy like a user's personal information can be back up at the repository in which the user selects, personal information can be effectively protected. According to an exemplary embodiment of the present invention, the number of repositories can be varied according to a profile structure or a backup policy of a provider in which a user subscribes.

DETAILED DESCRIPTION OF THE EMBODIMENTS

Figure 1:
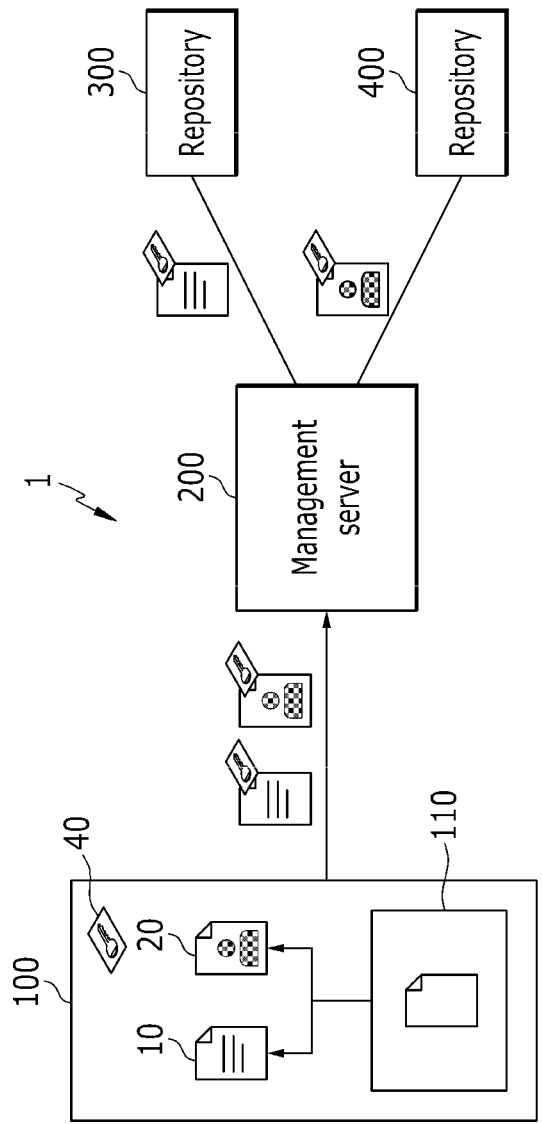
FIGS. 1 and 2 are diagrams illustrating a backup system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements.

Figure 2:
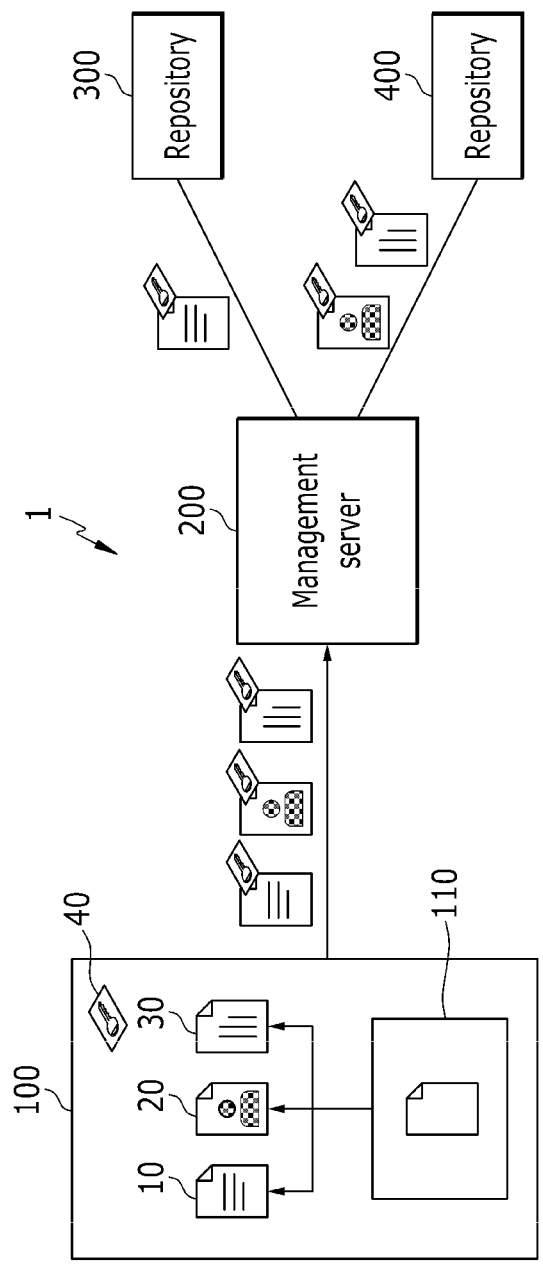

FIGS. 1 and 2 are diagrams illustrating a backup system according to an exemplary embodiment of the present invention.

Referring to FIG. 1, a backup system 1 includes a terminal 100, a management server 200, and a plurality of repositories 300 and 400. The management server 200 may be a subscriber management server (SMS).

The terminal 100 includes an authentication module 110. The authentication module may be replaced with various terms such as an authorization module, a certification module, a subscriber identification module, a subscriber identification module card, and a universal subscriber identification module. The authentication module 110 may be an embedded authentication module that is embedded at the terminal 100. The embedded authentication module cannot be separated and removed from the terminal 100. The embedded authentication module that is mounted in the terminal cannot be replaced with another embedded authentication module.

Here, the embedded authentication module may be an embedded universal integrated circuit card (eUICC).

The authentication module 110 stores profiles. The profiles include various information that is related to terminal operation such as user authentication information. The profiles may include provider information of a communication provider in which the user subscribes and personal information of the user. The terminal performs user authentication or terminal authentication using a profile.

The profile has a structure that is divided into a plurality of information. For example, the profile may be divided into provider information 10 of a communication provider in which the user subscribes and personal information 20 of the user.

The terminal 100 divides a profile. The terminal 100 encrypts each of the divided division profiles 10 and 20 using credentials 40.

The terminal 100 may provide an application screen that requests to select at least one repository to store division profiles to the user. For example, the user may select the repository 300 that stores the division profile 10 and may select the repository 400 that stores the division profile 20. When provider information is stored at only a repository that is designated by a communication provider, the terminal 100 may provide an application screen that requests to select a repository for only division profiles other than provider information.

The terminal 100 transmits the encrypted division profiles 10 and 20 and the selected repository information to the management server 200. In this case, the terminal 100 also transmits user identification information to the management server 200. The user identification information may be subscriber identification information. The user identification information may be, for example, user credentials or terminal intrinsic information. The user credentials may be, for example, identification (ID), password, and an access token. The terminal intrinsic information may be, for example, international mobile subscriber identity (IMSI).

The management server 200 stores user identification information and repository information. The management server 200 stores the division profiles 10 and 20 at the repositories 300 and 400, respectively. The repository 300 is a repository that is designated by a communication provider and is designated as a storage position of provider information. When there is no repository that is selected by the user, the management server 200 stores division profiles at a random repository.

Referring to FIG. 2, profiles may be divided into provider information 10, personal information 20, and information other than provider information 10 and personal information 20, i.e., other information 30. The other information may be third party information.

The terminal 100 transmits division profiles 10, 20, and 30 and selected repository information to the management server 200. Each of the division profiles 10, 20, and 30 is encrypted into credentials.

The management server 200 stores the division profiles 10, 20, and 30 at the designated repositories, respectively.

Figure 3:
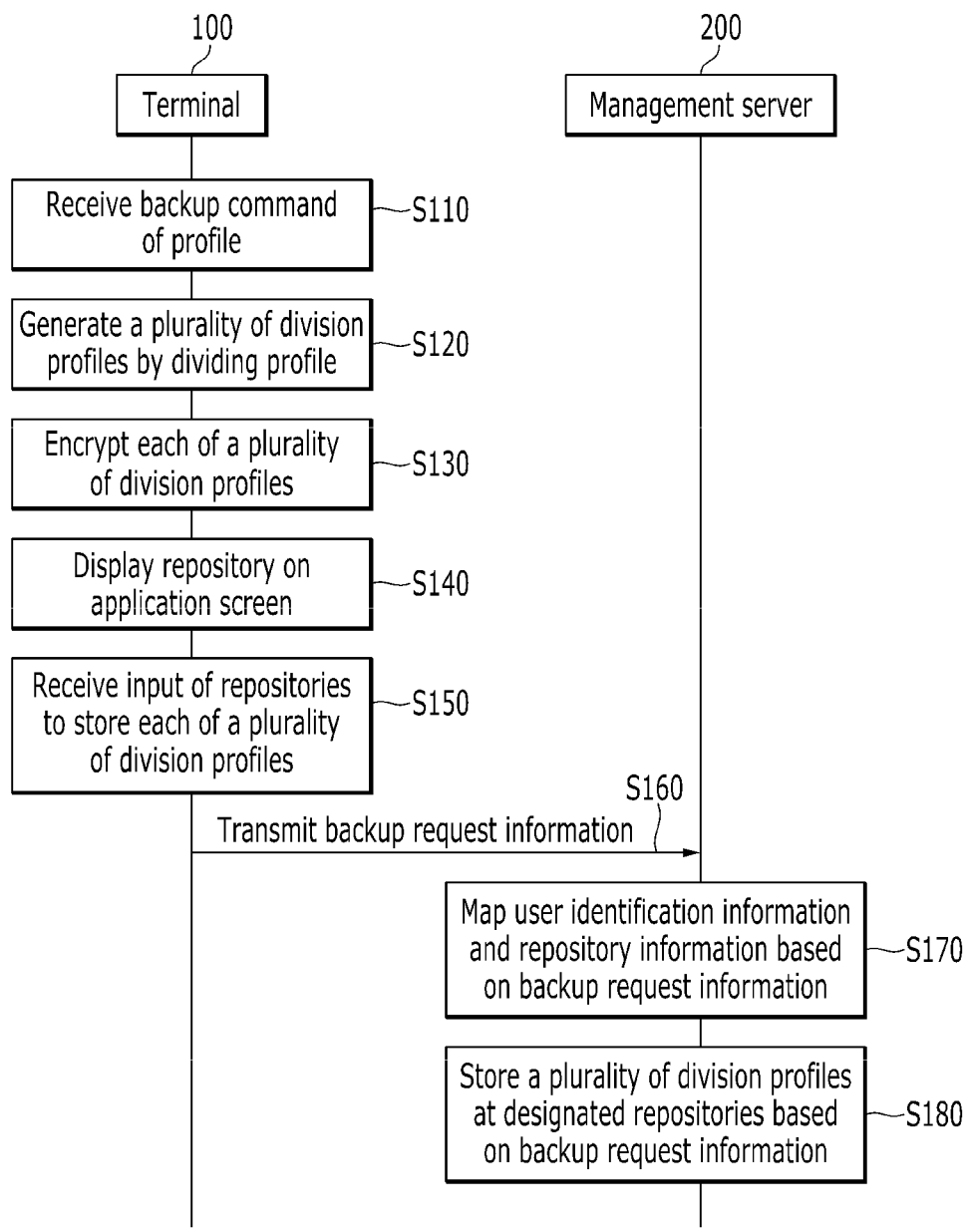
FIG. 3 is a flowchart illustrating a method of backing up a profile according to an exemplary embodiment of the present invention.

FIG. 3 is a flowchart illustrating a method of backing up a profile according to an exemplary embodiment of the present invention.

Referring to FIG. 3, the terminal 100 receives a backup command of a profile (S110).

The terminal 100 generates a plurality of division profiles by dividing a profile based on a division reference (S120). For example, the terminal 100 may divide a profile into provider information and personal information. Alternatively, the terminal may divide a profile into provider information, personal information, and other information.

The terminal 100 encrypts each of a plurality of division profiles using credentials (S130).

The terminal 100 searches for at least one repository and displays the found repository on an application screen (S140). The terminal 100 searches for repositories of a user account. The terminal 100 displays the found repositories on a screen.

The terminal 100 receives an input of repositories to store each of a plurality of division profiles (S150). The repository is selected by a user.

The terminal 100 transmits backup request information to the management server 200 (S160). The backup request information may include an encrypted plurality of division profiles, information of a repository of each division profile, and user identification information.

The management server 200 maps user identification information and repository information based on backup request information (S170).

The management server 200 stores a plurality of division profiles at designated repositories based on backup request information (S180).

FIGS. 4 to 7 illustrate an application screen for backing up a profile according to an exemplary embodiment of the present invention.

Figure 4:
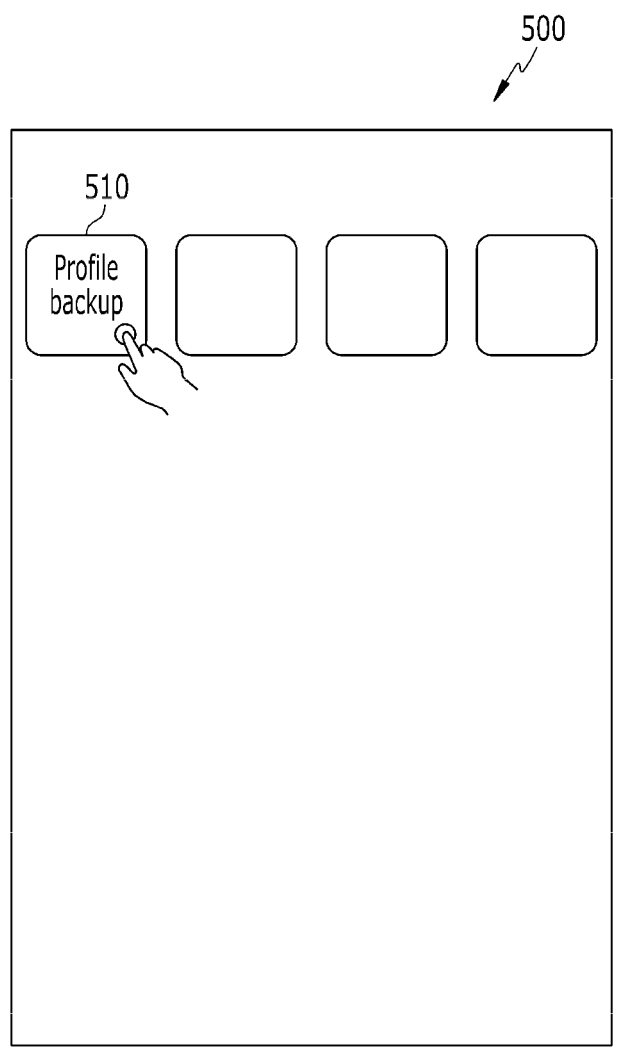
FIGS. 4 to 7 illustrate an application screen for backing up a profile according to an exemplary embodiment of the present invention.

Referring to FIG. 4, the terminal 100 provides an application for backing up a profile. When the terminal 100 executes an application, the application displays a profile backup icon 510 at a display 500 of the terminal 100. The application has information for connecting the management server 200.

Figure 5:
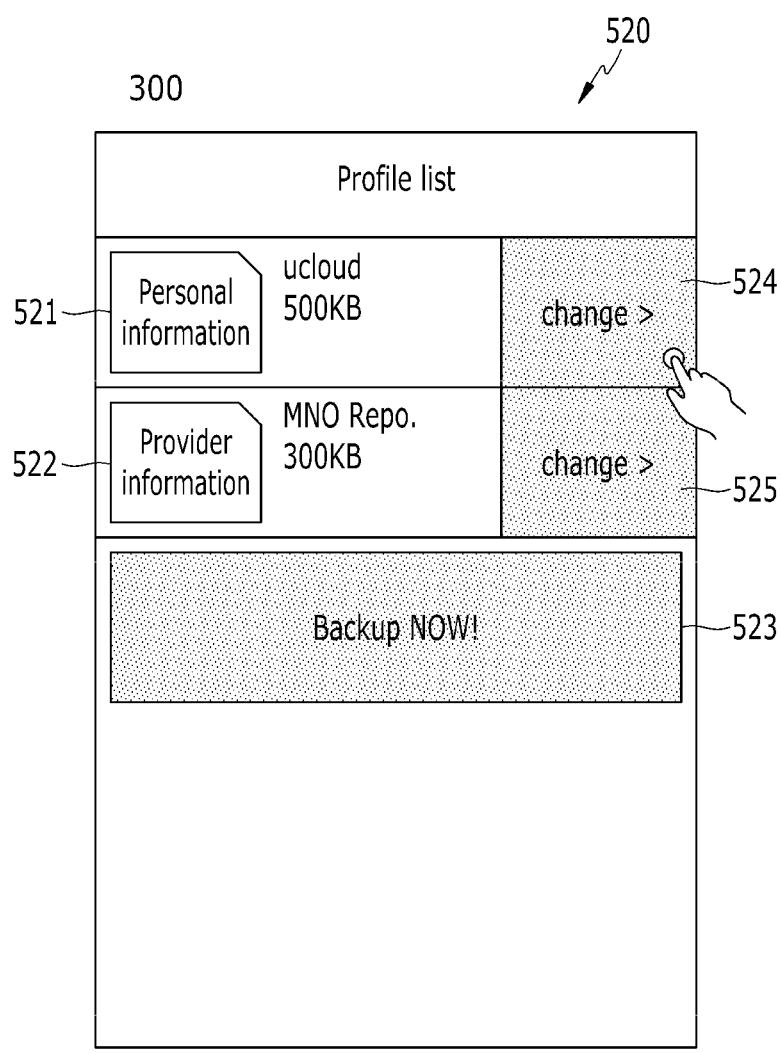

Referring to FIG. 5, when the user presses a profile backup icon 510, the application displays a profile backup screen 520.

The profile backup screen 520 displays a list of division profiles. For example, a division profile 521 may be personal information that is stored at an authentication module, and a division profile 522 may be provider information that is stored at an authentication module.

The profile backup screen 520 displays repository information of each division profile, for example, ucloud and an MNO repository. The profile backup screen 520 displays a file capacity of each division profile.

The profile backup screen 520 displays a backup execution menu 523 for backing up each division profile. The profile backup screen 520 displays menus 524 and 525 that can change a backup repository of each division profile.

Figure 6:
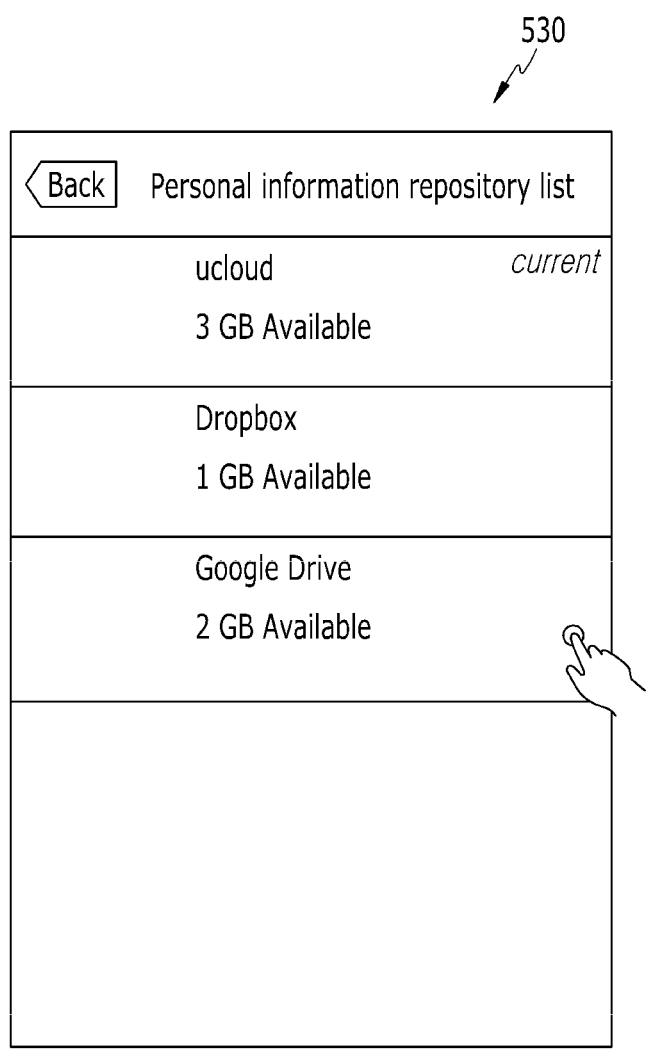

Referring to FIG. 6, in order to change a backup repository of personal information, when a user presses the menu 524, an application displays a personal information repository selection screen 530.

The personal information repository selection screen 530 displays a repository list. For example, the repository list may be ucloud, dropbox, and Google drive.

Figure 7:
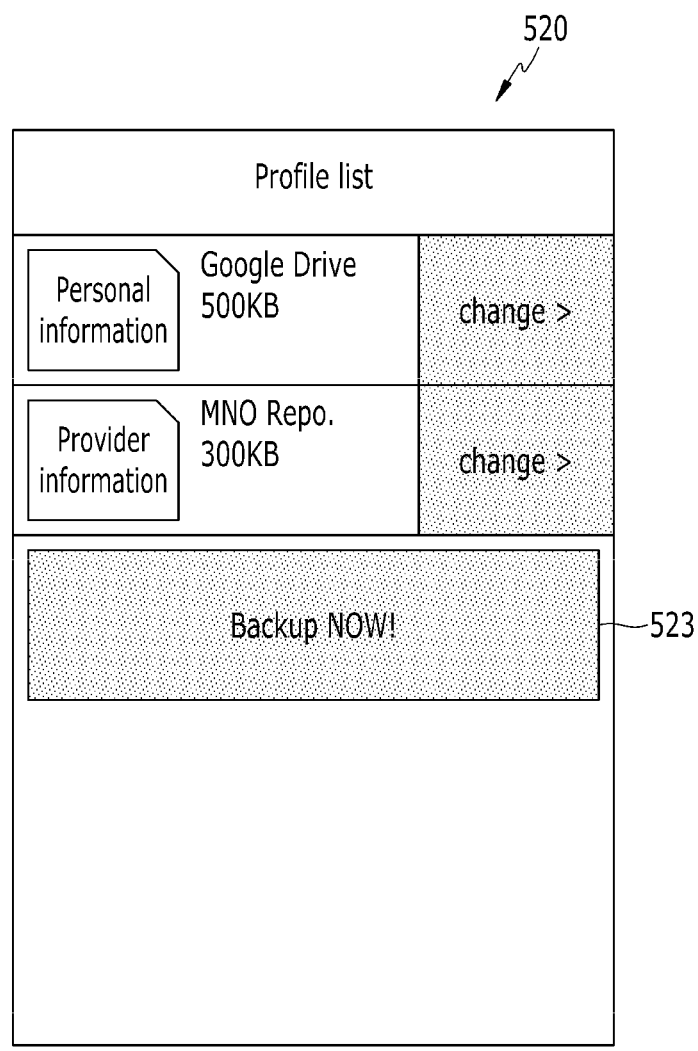

Referring to FIG. 7, when the user selects any repository on the personal information repository selection screen 530, a repository of personal information is changed to a selected repository.

When the user presses the backup execution menu 523, the application is connected to the management server 200. The application transmits backup request information to the management server 200 and requests to back up each division profile at the designated repository.

Figure 8:
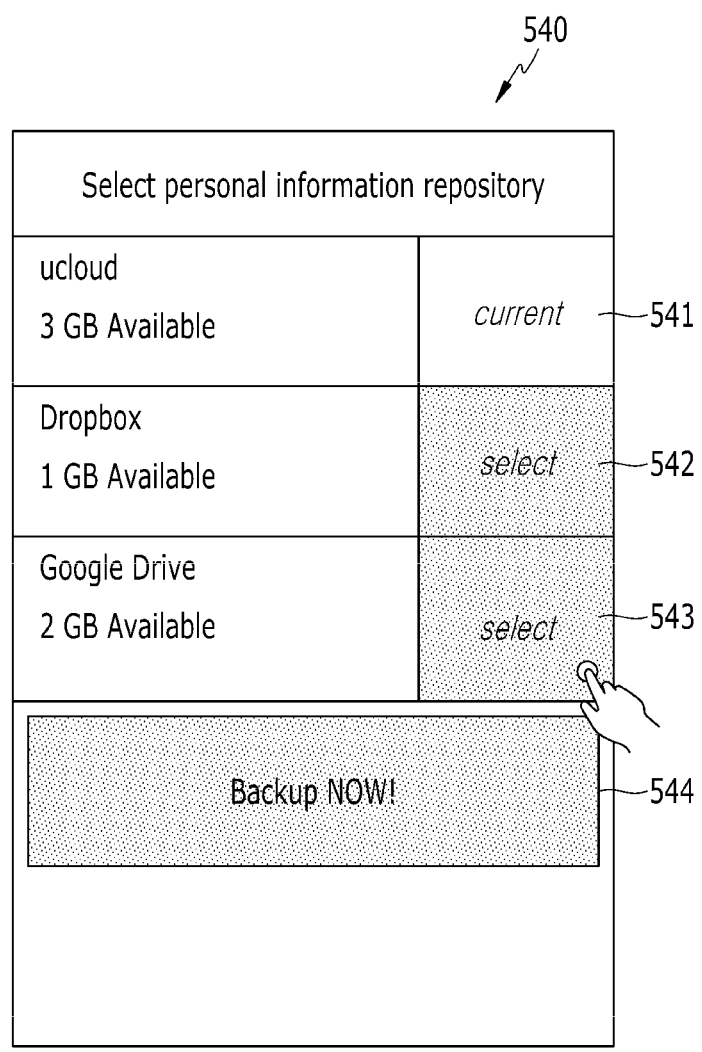
FIGS. 8 and 9 illustrate an application screen for backing up a profile according to another exemplary embodiment of the present invention.
Figure 9:
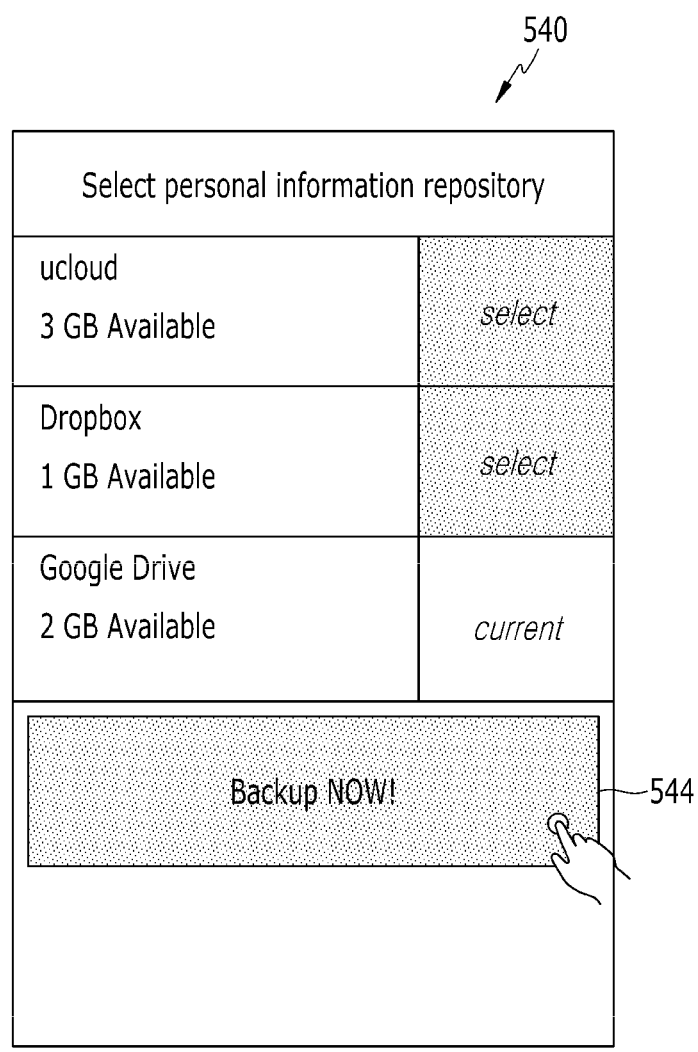

FIGS. 8 and 9 illustrate an application screen for backing up a profile according to another exemplary embodiment of the present invention.

Referring to FIG. 8, provider information of division profiles is stored at only a repository that is designated by a communication provider. In this case, the terminal 100 receives an input of a repository of division profiles other than provider information.

For example, when the user presses the profile backup icon 510, an application displays a personal information repository selection screen 540. The personal information repository selection screen 540 displays a repository list. For example, the repository list may be ucloud, dropbox, and Google drive. In this case, an application may display that any repository, for example, ucloud is a present backup repository of personal information (541). The application displays menus 542 and 543 that can select a backup repository in a repository list.

The personal information repository selection screen 540 displays a backup execution menu 544 for backing up each division profile.

Referring to FIG. 9, when the user selects any repository, for example, Google drive in a repository list, a repository of personal information is changed from ucloud to Google drive. Here, it has been described that a division profile is stored at one repository, but one division profile may be stored at a plurality of repositories.

When the user presses the backup execution menu 544, an application transmits backup request information to the management server 200 and requests to back up each division profile at the designated repository.

In this way, according to an exemplary embodiment of the present invention, a profile can be divided and back up at a plurality of repositories. According to an exemplary embodiment of the present invention, even if an authentication module cannot be physically detached, a profile that is stored at an authentication module can be freely transferred to another repository. Particularly, according to an exemplary embodiment of the present invention, because personal information sensitive to privacy like a user's personal information can be back up at the repository in which the user selects, personal information can be effectively protected. According to an exemplary embodiment of the present invention, the number of repositories can be varied according to a profile structure or a backup policy of a provider in which a user subscribes.

An exemplary embodiment of the present invention may be not only embodied through an apparatus and method but also embodied through a program that executes a function corresponding to a configuration of the exemplary embodiment of the present invention or through a recording medium on which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A system for backing up a profile that is stored at an authentication module, the system comprising:
   a terminal that divides a profile stored at the authentication module to generate a plurality of division profiles and that transmits backup request information comprising the plurality of division profiles; and
   a management server that receives the backup request information and that stores the plurality of division profiles based on the backup request information,
   wherein the plurality of division profiles comprise a first division profile comprising communication provider information and a second division profile comprising user's personal information, wherein the communication provider information comprises information on a communication provider to which the user is subscribed, and wherein the plurality of division profiles further comprise a third division profile comprising other information, and the other information is information other than the communication provider information and the personal information in the profile.

2. The system of claim 1, wherein the terminal encrypts each of the plurality of division profiles and transmits the plurality of encrypted division profiles to the management server.

3. The system of claim 1, wherein the terminal receives an input of information of at least one repository that stores the plurality of division profiles.

4. The system of claim 3, wherein the backup request information further comprises the repository information.

5. The system of claim 4, wherein the management server stores each of the plurality of division profiles at a designated repository.

6. The system of claim 1, wherein the backup request information further comprises user identification information.

7. The system of claim 1, wherein the management server stores the first division profile at a repository designated by the communication provider.

8. The system of claim 1, wherein the authentication module is an embedded authentication module that is embedded at the terminal.

9. A method in which a terminal backs up a profile that is stored at an authentication module at a management server, the method comprising:
dividing a profile stored at the authentication module to generate a plurality of division profiles; and
transmitting backup request information comprising the plurality of division profiles to the management server,
wherein the plurality of division profiles comprise a first division profile comprising communication provider information and a second division profile comprising user's personal information,
wherein the communication provider information comprises information on a communication provider to which the user is subscribed, and
wherein the plurality of division profiles further comprise a third division profile comprising other information, and the other information is information other than the communication provider information and the personal information in the profile.

10. The method of claim 9, further comprising encrypting each of the plurality of division profiles,
wherein the backup request information comprises the plurality of encrypted division profiles.

11. The method of claim 10, further comprising receiving an input of information of at least one repository that stores the plurality of division profiles,
wherein the backup request information further comprises the repository information.

12. The method of claim 9, wherein the backup request information further comprises user identification information.

13. A method in which a management server backs up a profile of an authentication module, the method comprising:
receiving backup request information comprising a plurality of division profiles and repository information indicating a plurality of repositories where the plurality of division profiles are to be stored from a terminal; and
storing the plurality of division profiles at designated repositories based on the backup request information including the repository information,
wherein the plurality of division profiles comprise a first division profile comprising communication provider information and a second division profile comprising user's personal information,
wherein the communication provider information comprises information on a communication provider to which the user is subscribed, and
wherein the plurality of division profiles further comprise a third division profile comprising other information, and the other information is information other than the communication provider information and the personal information in the profile.

14. The method of claim 13, wherein the backup request information comprises the encrypted plurality of division profiles.

15. The method of claim 13, wherein the backup request information further comprises information of at least one repository that stores the plurality of division profiles, and
the storing of the plurality of division profiles comprises storing each of the plurality of division profiles at a designated repository.

16. The method of claim 15, further comprising mapping and storing user identification information and the repository information,
wherein the backup request information further comprises the user identification information.

17. The system of claim 1, wherein the authentication module is an embedded universal integrated circuit card (UICC).

18. The system of claim 1, wherein the authentication module is a subscriber identity module (SIM).

* * * * *